UNITED STATES PATENT OFFICE.

ELIAS PETERSSON, OF BRUSSELS, BELGIUM, ASSIGNOR TO THE INTRACTABLE ORE TREATMENT COMPANY, LIMITED, OF LONDON, ENGLAND.

PROCESS OF TREATING SULFUROUS ARSENIC ORES.

SPECIFICATION forming part of Letters Patent No. 670,140, dated March 19, 1901.

Application filed December 30, 1898. Serial No. 700,759. (No specimens.)

*To all whom it may concern:*

Be it known that I, ELIAS PETERSSON, engineer, a Swedish subject, residing at No. 32 Avenue de la Couronne, Brussels, Belgium, have invented a certain new and useful Process for the Treatment of Sulfurous Ores Containing Arsenic, Antimony, and Tellurium, (for which I have applied for patents in Italy, dated June 11, 1898, No. 98/35; in Great Britain, dated October 7, 1898; in Sweden, dated December 9, 1898; in Norway, dated December 10, 1898; in Spain, dated December 10, 1898; in Belgium, dated December 10, 1898, and in France, dated December 10, 1898,) of which the following is a specification.

This invention consists in a process of treatment of sulfurous ores containing arsenic, antimony, and tellurium whether for extracting these metals therefrom or for rendering the said ores capable of treatment by ordinary processes with the object of extracting gold, silver, copper, zinc, nickel, lead, &c.

In order to avoid the considerable loss of precious metals accompanying the direct roasting of so-called "refractory ores" for expelling therefrom the arsenic, antimony, and tellurium, various processes have been proposed with the object of separating the different sulfurets. These processes are based upon the addition of sulfurets or polysulfurets or of a mixture of alkaline sulfate and carbon, forming the sulfuret during the course of the process.

In the process constituting this invention the different sulfurets are set free without any change in their chemical constitution taking place. For this purpose the ore in a finely-pulverized state is mixed with carbon, also reduced to powder, and the mixture is heated in a retort or muffle-furnace to a temperature which may vary from a dull-red to a bright-red heat, according to the nature of the ore. The arsenic is set free in the state of arsenic-sulfid vapor and passes away from the retort through a suitable outlet, while the antimony and the tellurium remain in the matter under treatment in the state of sulfurets. The carbon prevents all contact of air by destroying the small quantity of oxygen that may enter the muffle of the furnace and forming carbonic acid; but no chemical action appears to take place, as the carbon remains unchanged. The product which leaves the furnace after the operation is finished retains its pulverulent condition, not having become agglomerated, as the carbon admixed with it prevents "liquation"—that is, it keeps any particles which may be melted from running together, the bulk of the carbon remaining unchanged, as above stated. The resulting product may be directly roasted, then subjected to washing with acids for the purpose of removing therefrom the antimony and tellurium, and subsequently treated by ordinary processes for extraction of the metals which it contains—viz., gold, silver, copper, zinc, &c. As the ore after roasting in the muffle-furnace still contains most of its sulfur, it may be used in the manufacture of sulfuric acid.

By way of example I will cite two applications which have been made of the above process.

First. A finely-crushed pyrite containing fifteen per cent. of arsenic has been mixed with ten per cent. of carbon in powder and the mixture has been treated for about one hour in a muffle-furnace at a temperature of about 800° centigrade. All the arsenic sulfid (trisulfuret of arsenic) has become volatilized and the product obtained contained only traces of arsenic. By the ordinary processes of roasting and cyanuration ninety-eight per cent. of the gold contained in the ore was subsequently extracted.

Second. A finely-crushed antimonial pyrite has been mixed with ten per cent. of carbon in powder. The mixture has been heated for about half an hour at a temperature of 700° to 800° centigrade in a muffle-furnace, the mass withdrawn from the furnace has been freed from its antimony by calcination and lixiviation with water acidulated with chlorhydric acid, and the product has yielded the whole amount of gold contained in the ore.

It is evident that the carbon which I employ might be replaced by other organic matter capable of yielding carbon by calcination. The carbon I employ is preferably in the form of coal.

An ore composed of iron pyrites, mispickel, quartz and gold, silver, and platinum (or other precious metals) is a typical example of an ore which can advantageously be treated by my process. In this ore arsenic exists in combination with iron and sulfur, and the gold is frequently so intimately associated with the arsenic-bearing mineral as to be impossible of separation by any of the ordinarily-known means.

When roasted in a finely-divided state admixed with carbonaceous material, also finely divided in a retort or muffle, the arsenic is wholly volatilized as sulfid, the iron pyrites ($FeS_2$) furnishing some of its sulfur for the purpose and remaining as $FeS$ in the residue, while the gold and other precious metals remain untouched and can now be extracted from the non-volatile residuum after an oxidizing calcination by the employment of ordinary methods, such as amalgamation, cyaniding, &c. If antimony be present, the residuum after the second or oxidizing calcination is subjected to hydrochloric-acid wash to remove this metal as a soluble chlorid. The arsenic is condensed in the form of sulfids of arsenic.

Having fully described my invention, what I claim, and desire to secure by Letters Patent, is—

1. A process of treatment of sulfurous ores containing arsenic as sulfid in addition to other metals, consisting in pulverizing the ore, in mixing the same with carbon likewise pulverized and in heating the mixture in a retort or muffle to which all inlet of air or other gas is precluded and in continuing the heating until the arsenic in the mixture has been driven off from the ore as sulfid without material reduction and expelled from the retort substantially as described.

2. A process of treatment of sulfurous ores containing arsenic, and antimony as sulfids in addition to other metals consisting in pulverizing the ore, in mixing the same with carbon likewise pulverized, in heating the mixture in a retort or muffle to which all inlet of air or other gas is precluded and in continuing the heating until the arsenic has been driven off as sulfid without material reduction and expelled from the retort, and in afterward calcining the residue left in the retort and in washing the calcined residue with acid to extract from it such antimony and tellurium as may be contained in it before proceeding to extract the other metals.

In witness whereof I have hereunto set my hand, in presence of two witnesses, this 16th day of December, 1898.

ELIAS PETERSSON.

Witnesses:
H. T. E. KIRKPATRICK,
I. S. KIRKPATRICK.